United States Patent
Adleff

(10) Patent No.: US 7,647,851 B2
(45) Date of Patent: Jan. 19, 2010

(54) PROPULSION POWER TRANSMISSION DEVICE WITH A HYDRODYNAMIC REVERSE CLUTCH

(75) Inventor: Kurt Adleff, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 339 days.

(21) Appl. No.: 10/586,225

(22) PCT Filed: Nov. 27, 2004

(86) PCT No.: PCT/EP2004/013468

§ 371 (c)(1),
(2), (4) Date: Jun. 8, 2007

(87) PCT Pub. No.: WO2005/068800

PCT Pub. Date: Jul. 28, 2005

(65) Prior Publication Data

US 2007/0272052 A1 Nov. 29, 2007

(30) Foreign Application Priority Data

Jan. 15, 2004 (DE) ................. 10 2004 002 215

(51) Int. Cl.
*F16J 47/00* (2006.01)
*F16H 35/08* (2006.01)
*F02G 3/00* (2006.01)

(52) U.S. Cl. .................. 74/720; 74/404; 60/624

(58) Field of Classification Search ............. 74/404, 74/720, 730.1, 732.1; 475/59, 66; 477/53, 477/55, 67, 68; 60/624
See application file for complete search history.

(56) References Cited

U.S. PATENT DOCUMENTS 2,748,621 A * 6/1956 Sinclair ................ 74/720

(Continued)

FOREIGN PATENT DOCUMENTS

DE 38 75 300 T2 4/1993

(Continued)

OTHER PUBLICATIONS

International Preliminary Report on Patentability/Written Opinion based on PCT/EP2004/013468 Dated Oct. 26, 2006.

*Primary Examiner*—Roger Pang
(74) *Attorney, Agent, or Firm*—Ohlandt, Greeley, Ruggiero & Perle, L.L.P.

(57) ABSTRACT

The invention relates to a propulsion power transmission device having a first interface (1) and a second interface (2). According to the invention, a hydrodynamic clutch is mounted in the driving connection between the first interface and the second interface and a first gear train (4) and a second gear train (5) are mounted parallel to each other in the driving connection, in series with the hydrodynamic clutch, the second gear train (5) causing a reversal in the direction of rotation in relation to the first gear train (4) at one of the two interfaces (1, 2). The propulsion power transmission device of the invention is characterized by the following features: the hydrodynamic clutch has two separate working chambers (3.1, 3.2), which can be independently filled with and drained of a working medium in order to transfer torque from one bladed primary wheel (3.3, 3.4) to at least one bladed secondary wheel (3.5) of the hydrodynamic clutch (3), with the blades of the primary wheels and of the at least one secondary wheel being arranged opposite each other; the first gear train and the second gear train (5) are respectively continuously connected to the first primary wheel (3.1)[1] and the second primary wheel (3.2)[2] in a driving manner; and both gear trains (4, 5) are continuously connected to one of the two interfaces (1, 2) in a driving manner.

8 Claims, 2 Drawing Sheets

U.S. PATENT DOCUMENTS

Figure 1:
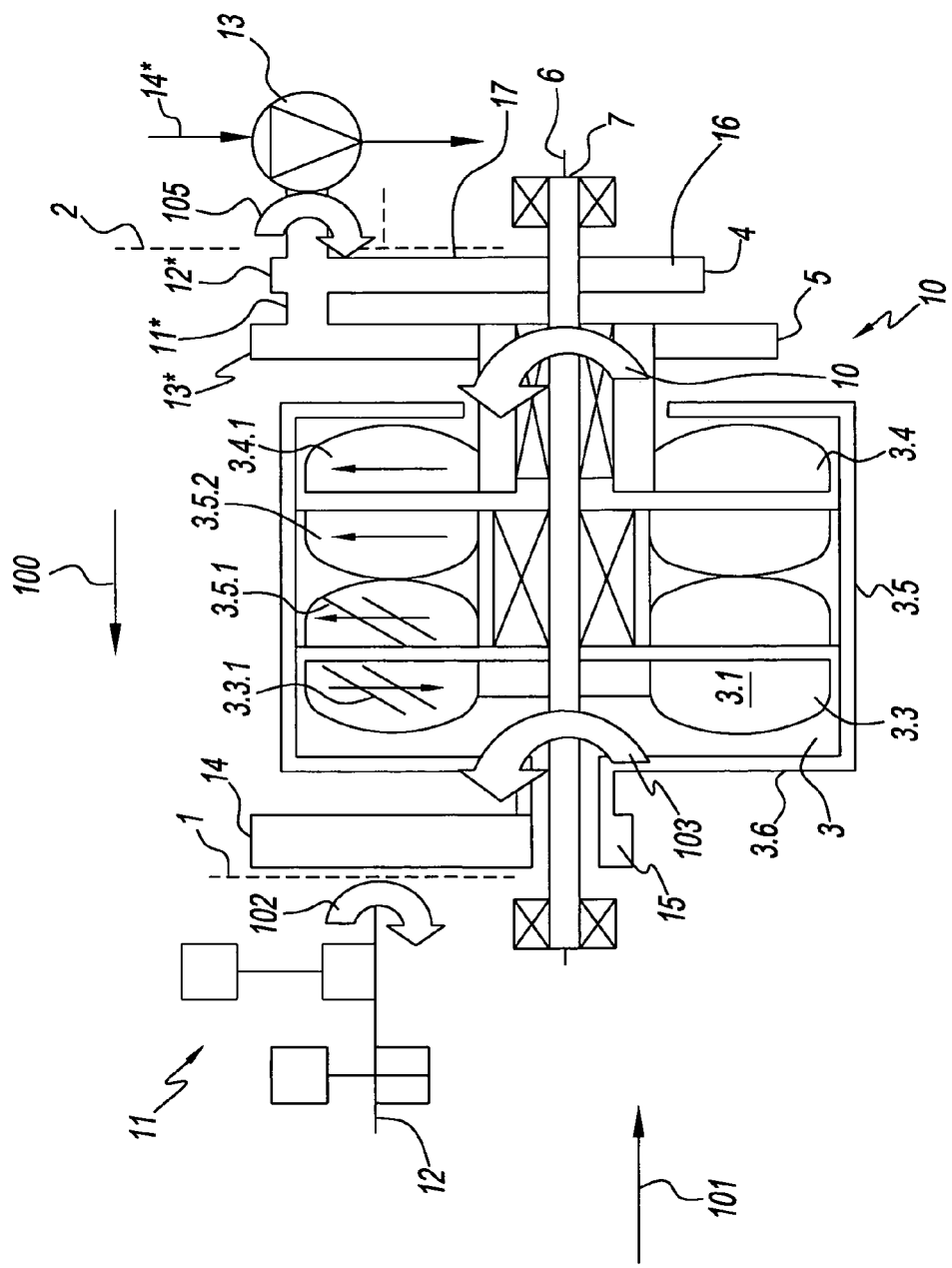

| | | | |
|---|---|---|---|
| 3,887,048 A * | 6/1975 | Jahnel et al. | 192/3.28 |
| 4,748,812 A | 6/1988 | Okada et al. | 60/614 |
| 4,858,440 A * | 8/1989 | Okada | 60/614 |
| 4,872,311 A | 10/1989 | Sturm | 60/615 |
| 4,882,906 A * | 11/1989 | Sekiyama et al. | 60/624 |
| 4,894,992 A | 1/1990 | Sekiyama | 60/624 |
| 5,138,840 A | 8/1992 | Oguchi et al. | 60/624 |
| 5,884,482 A | 3/1999 | Lange et al. | 60/624 |
| 2007/0283699 A1 * | 12/2007 | Kley et al. | 60/605.2 |

FOREIGN PATENT DOCUMENTS

| | | |
|---|---|---|
| DE | 44 29 855 C1 | 8/1995 |
| DE | 199 01 296 A1 | 7/2000 |
| EP | 0 805 287 A2 | 4/1997 |
| EP | 1 081 003 A1 | 8/2000 |
| WO | WO 03/001041 A1 | 1/2003 |

* cited by examiner

PROPULSION POWER TRANSMISSION DEVICE WITH A HYDRODYNAMIC REVERSE CLUTCH

The invention relates to a propulsion power transmission device for transmitting driving power between two shafts, particularly in an automotive driveline. In accordance with one embodiment, the invention relates to a so-called turbocompound system having such a propulsion power transmission device between the crankshaft of an internal combustion engine and an exhaust gas turbine.

A propulsion power transmission device with the features that are disclosed, for example, in the U.S. Patent having the number U.S. Pat. No. 4,748,812. The propulsion power transmission device shown therein has two interfaces for transmitting driving power from the propulsion power transmission device or to the propulsion power transmission device, respectively. One interface is connected to the engine crankshaft and the other interface is connected to the exhaust gas turbine. The propulsion power transmission device shown has a hydrodynamic clutch for transmitting power from the exhaust gas turbine to the crankshaft in so-called turbine operation and from the engine crankshaft to the exhaust gas turbine during so-called braking operation. During braking operation, the direction of rotation of the exhaust gas turbine is reversed in order to operate the exhaust gas turbine as a pump and thus to produce braking torque. The reversal of the direction of rotation has the advantage that a comparatively higher braking torque can be produced than in those turbocompound systems in which the exhaust turbine always rotates in the same direction, such as, for example, in the U.S. Patent having the number U.S. Pat. No. 5,884,482.

In order to accomplish the reversal in the direction of rotation of the exhaust gas turbine during braking operation, a reversing gear with two parallel gear trains is arranged between the engine crankshaft and the hydrodynamic clutch and one gear train is constructed with an additional idler gear wheel in order to bring about an opposite direction of rotation on the output side in relation to the other gear train. Through the use of mechanical clutches, the two gear trains are connected in such a way that always only a single gear train transmits driving power in a driving connection.

On account of the necessary switching between the gear trains and the use of mechanical clutches, particularly multi-disc clutches, the system shown has the drawbacks that it is comparatively complicated and thus expensive to manufacture and, in addition, on account of the numerous mechanical, switchable components, it is subject to breakdown and requires intensive maintenance.

The invention is based on the problem of producing a propulsion power transmission device that is improved over the prior art. In particular, a largely wear-free switching function will be made possible and the construction expense will be reduced. It should therefore be possible to use the propulsion power transmission device in turbocompound systems in particular.

The propulsion power transmission device of the invention is characterized by a hydrodynamic clutch, which has two working chambers that are separated from each other in their arrangement and that can each be filled independently with working medium for transmitting torque from a bladed primary wheel to a bladed secondary wheel. In order to create the two working chambers, two primary wheels and at least one secondary wheel are provided, with the second wheel having advantageously two sets of blades, namely, one set of blades for each of the two working chambers. The two sets of blades can be constructed, for example, in a back-to-back arrangement in a common secondary wheel.

The respective blades of the primary wheel and the corresponding sets of blades of the at least one secondary wheel are arranged—as is conventionally the case for hydrodynamic clutches—opposite each other so as to create a toroidal working chamber.

Two parallel gear trains are provided, which are continuously connected to one of the two interfaces in a driving manner. The first gear train is furthermore connected to the first primary wheel in a driving manner and the second gear train is continuously connected to the second primary wheel in a driving manner.

In the sense of the present invention, the expression "can be filled" or "is filled" is understood to mean both a complete filling as well as a partial filling. The expression "can be drained" or "is drained" is understood to mean a complete evacuation or a draining up to a predetermined residual quantity of working medium in the working chamber.

According to an advantageous embodiment, the at least one secondary wheel, particularly the common secondary wheel, is continuously connected to the first interface in a driving manner and the two gear trains are continuously connected indirectly to the second interface in a driving manner. Here, the primary wheels may be arranged on a common axis, for example, it being advantageous for one of the primary wheels to be mounted in a torsionally rigid manner and the other primary wheel in a rotatable manner on the common axis. Advantageously, the common axis further bears a gear wheel of one of the two gear trains in a torsionally rigid manner.

The at least one secondary wheel, particularly the common secondary wheel, can advantageously also be arranged on the common axis, namely axially between the two primary wheels. Here, the at least one secondary wheel is mounted in a rotatable manner on the common axis, that is, by means of a so-called relative bearing.

Also, respectively, one gear wheel of the two gear trains can be mounted on the common axis, it then being advantageous for the gear wheel of the gear train that is in direct driving connection with the primary wheel arranged on the common axis in a rotatable manner to be arranged on the common axis in a rotatable manner and for the gear wheel of the second gear train that is in direct driving connection with the primary wheel that is mounted on the common axis in a torsionally rigid manner to likewise be mounted on the common axis in a torsionally rigid manner, so that the corresponding torque is transmitted via the common axis between the primary wheel and the gear train.

Advantageously, the blades of the primary wheels and of the at least one secondary wheel are arranged at an inclination with respect to the central axis of the hydrodynamic clutch; that is, they are not oriented perpendicular to the plane of a radial section through a working chamber of the hydrodynamic clutch.

In the case of such an inclined arrangement of the blades, a distinction is made in terms of their relative movement toward each other between a backward-swept arrangement and a forward-swept arrangement. In the case of both arrangements, the opposite-lying blades align with each other. In the case of a backward-swept arrangement, the blades of the driving wheel are inclined oppositely to the direction of rotation of the driving wheel, starting from the axial end that faces the driven wheel, whereas, in the case of the forward-swept arrangement, the blades of the driving wheel are inclined in the direction of rotation of the driving wheel, starting from the axial end that faces the driven wheel.

According to an advantageous construction, the blades of the two working chambers are arranged at an inclination in such a way that, for the direction of rotation that is adjusted during drained operation of the corresponding working chamber, the opposite-lying blades rotate with respect to one another in a forward-swept manner.

The common secondary wheel can, together with the housing of the hydrodynamic clutch, enclose the two primary wheels at least partially, this being better understood by way of the embodiment example shown further below and in the figures.

The turbocompound system of the invention comprises an internal combustion engine having a crankshaft and an exhaust gas turbine, which is arranged in an exhaust gas flow of the internal combustion engine and can be switched in a driving connection with the crankshaft of the internal combustion engine. In this respect, the turbocompound system of the invention has the conventional features of known turbocompound systems.

In the turbo compound system of the invention, however, a propulsion power transmission device, which has the features of the invention described above, in the driving connection, is switched between the exhaust gas turbine and the crankshaft. One interface is connected continuously to the crankshaft in a driving manner, while the other interface is connected continuously to the exhaust gas turbine in a driving manner. By switching the propulsion power transmission device of the invention by a corresponding targeted filling of one or the other working chamber, the shafts in both interfaces rotate either in the same direction of rotation or in opposite directions of rotation and this results in a corresponding driving power flow from the crankshaft to the exhaust gas turbine or from the exhaust gas turbine to the crankshaft.

Obviously, it is possible also to fill both working chambers at the same time with working medium in order to produce an additional braking torque within the clutch. Such a system would then work as a so-called turbo compound retarder system.

The invention will be described in greater detail below on the basis of an embodiment example and the figures.

Figure 2:
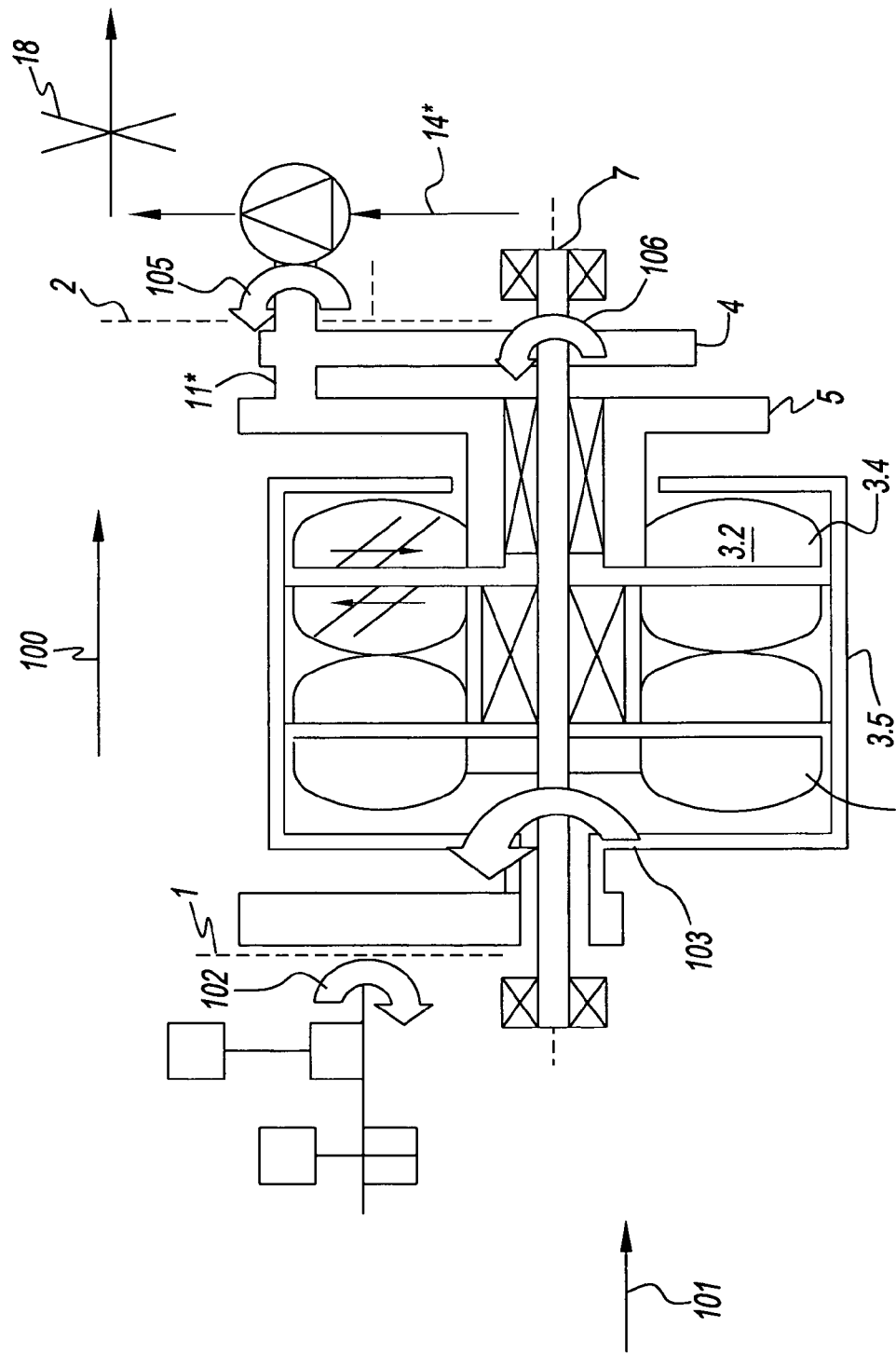

Shown are:

FIG. 1 a schematic depiction of the power flow in a turbo compound system having a propulsion power transmission device during nominal operation;

FIG. 2 the turbo compound system of the invention from FIG. 1 during braking operation.

Evident in FIG. 1 is a first interface 1, which is formed by a crankshaft 12 of a schematically depicted internal combustion engine 11. Evident at the other, axially opposite-lying end of a propulsion power transmission device 10 is an interface 2, which is formed by a shaft 11*, which bears pinion gears 12* and 13* of a first gear train 4 and of a second gear train 5 and which is connected to the rotor of an exhaust gas turbine 13 in a torsionally rigid manner. The crankshaft 12 bears in addition a gear wheel 14, which, via a gear wheel 15, which is connected to a housing 3.6 in a torsionally rigid manner or is integrally constructed with this housing, drives a secondary wheel 3.5 of a hydrodynamic clutch 3, which is connected to the housing 3.6 in a torsionally rigid manner or is integrally constructed with this housing.

A common shaft 7 (along the central axis 6 of the hydrodynamic clutch 3) is mounted in a rotatable manner on both sides of the hydrodynamic clutch or at the axial ends of the propulsion power transmission device 10 and is connected in a torsionally fixed manner to a first primary wheel 3.3 as well as to a gear wheel 16 of the first gear train 4. A gear wheel 17 of the second gear train 5, which mates with the pinion gear 13, is relatively mounted on the common shaft 7; that is, it is borne by the common shaft 7 in a rotary manner.

The common shaft 7 further bears the common secondary wheel 3.5 in a rotary manner; that is the secondary wheel 3.5 is relatively mounted on the common shaft 7. Because the housing 3.6 of the hydrodynamic clutch 3 is connected to the common secondary wheel 3.5 or is integrally constructed with it, the housing 3.6, too, is also borne in a rotary manner via the bearing of the secondary wheel 3.5 on the common shaft 7.

The hydrodynamic clutch 3 has two working chambers 3.1 and 3.2, which can be filled with or drained of working medium independently of each other. The first working chamber 3.1 is formed by the primary wheel 3.3 and the first part of the secondary wheel 3.5 and the second working chamber 3.2 is formed by a primary wheel 3.4 and the second part of the secondary wheel 3.5. The primary wheels and the corresponding parts of the secondary wheel are opposite-lying, as is known for hydrodynamic clutches, in such a way that each working chamber is shaped in the form of a toroidal ring.

The blading of the primary wheels or of the common secondary wheel, respectively, is depicted schematically precisely, as is the direction of rotation of the blading by the arrows drawn in the working chambers. Here, the schematic depiction is to be viewed in such a way that the blades are shown in an axial plan view and the direction of rotation is indicated in a corresponding manner in an axial plan view. The first primary wheel 3.3 bears a blading 3.3.1, the second primary wheel 3.4 bears a blading 3.4.1, and the common secondary wheel 3.5 bears a blading 3.5.1 as well as a blading 3.5.2. As can be seen, the bladings 3.5.1 and 3.5.2 of the secondary wheel 3.5 are designed in a back-to-back arrangement.

An especially compact arrangement is achieved in that the common secondary wheel 3.5, together with the housing 3.6, encloses the two primary wheels 3.3 and 3.4 on three sides, the fourth side being covered by the common shaft 7. Accordingly, a slight sealing of the two working chambers 3.1 and 3.2 against the surroundings is also possible.

The exhaust gas turbine is—as is conventional for turbocompound systems—arranged in an exhaust gas flow 14* of the internal combustion engine. Obviously, further exhaust gas systems, such as, for example, an exhaust gas turbocharger, comprising an additional exhaust gas turbine and a compressor, can also be provided.

The exhaust gas turbine 13, which, via the shaft 11, which bears the two pinion gears 12 and 13 of the first and second gear trains 4 and 5 in a torsionally fixed manner and is continuously connected to the two gear trains 4, 5 in a driving manner, can be operated in two opposite directions of rotation. This is achieved by incorporating an additional reversing wheel 17 between the pinion gear 12 and the gear wheel 16 of the first gear train 4.

The different operating modes of the device shown are explained in detail below:

The power flow, that is, the direction of propulsion power transmission, is indicated by the arrow 100. In accordance with FIG. 1, in which the nominal operation, which is also referred to as turbine operation, is depicted, driving or propulsion power is transmitted from the exhaust gas turbine 13 to the crankshaft 12. The exhaust gas turbine 13 drives the shaft 11, namely in the direction of rotation that is depicted by the arrow 105. All directions of rotation are given here in relation to a direction of view as depicted by the arrow 101. The rotary motion of the shaft 11 is transmitted via the second gear train 5 to the second primary wheel 3.4. Because the second working chamber 3.2 is filled with working medium, the second primary wheel 3.4 drives the secondary wheel 3.5 correspondingly in the same direction of revolution—see the arrow in the working chamber 3.2. This direction of revolution is opposite to the direction of rotation of the shaft 11 due to the fact that exclusively two gear wheels mate with each other—gear wheel 5 and pinion gear 13—and this is depicted by the arrow 104. In a corresponding manner, the housing 3.6 rotates in the same direction as well—see the arrow 103. Because the housing 3.6 mates via the gear wheel 15 with the gear wheel 14, the crankshaft 12 is driven in the opposite direction—see the arrow 102.

On account of the continuous driving connection between the two gear trains 4 and 5 and the output shaft of the exhaust gas turbine 13, the first gear train 4 is driven as well. Accordingly, the common shaft 7 is rotated via the first gear train 4 in the same direction as the shaft 11, namely, due to the additional intervening wheel 17. Via the common shaft 7, the first primary wheel 3.3 is accordingly driven as well, namely in opposite direction to that of the second primary wheel 3.4, as depicted by the arrow over the blading 3.3.1 of the first primary wheel 3.3. Accordingly, the first primary wheel 3.3 revolves in opposite direction to that of the secondary wheel 3.5 and a slip of 200 percent results. Because, however, the working chamber 3.1 between the first primary wheel 3.3 and the secondary wheel 3.5 is not filled at all with working medium or is not filled except for a predetermined residual quantity of working medium, no torque or nearly no torque is transmitted from the first primary wheel 3.3 to the secondary wheel 3.5 and thus no power loss with respect to the drive of the crankshaft 12 by the exhaust gas turbine 13 is produced. Such a minimization of the power loss is achieved, in particular, by the fact that the opposite-lying blades of the first primary wheel 3.3.1 and of the secondary wheel 3.5.1 are arranged at an inclination with respect to the longitudinal axis 6 of the hydrodynamic clutch 3 in such a way that, in the operating mode shown, they are driven in a forward-swept manner in relation to each other. The opposite-lying blades 3.4.1 and 3.5.2 of the first primary wheel and of the secondary wheel, by contrast, are positioned with respect to the longitudinal axis 6 at an opposing angle to the blades in the first working chamber 3.1, so that, in the operating mode shown, they are driven in a backward-swept manner in relation to each other; this leads to an especially effective power transmission between the second primary wheel 3.4 and the common secondary wheel 3.5 and to a correspondingly low-loss transmission of the driving power from the exhaust gas turbine 13 to the crankshaft 12.

Depicted in FIG. 2 is the second mode of operation, namely the braking operation mode. In this mode of operation, the driving power of the crankshaft 12 is transmitted to the exhaust gas turbine 13—see the direction of the arrow 100—and this leads, on the one hand, to a braking of the crankshaft 12 and, on the other hand, allows the exhaust gas turbine 13 to work as a pump with a comparatively high degree of efficiency by reversal of its direction of rotation in relation to that of the turbine operation. Corresponding to the reversal of the direction of rotation of the exhaust gas turbine 13, the exhaust gas turbine 13 pumps an exhaust gas flow in the opposite direction of the exhaust gas flow during nominal operation against the throttling site 18—see the reversal of the arrow 14, which indicates the exhaust gas flow.

The crankshaft 12 drives the housing 3.6 and thus the secondary wheel 3.5 via the gear wheel 14 in an unchanged direction of rotation (see arrow 102), namely in the direction or rotation 103, which is likewise unchanged in comparison to nominal operation, because the crankshaft 12 revolves continuously in the same direction.

During braking operation in accordance with FIG. 2, however, the working chamber 3.1 is filled with working medium, so that torque is transmitted from the secondary wheel 3.5 to the first primary wheel 3.3. Correspondingly, the primary wheel 3.3 now revolves in the same direction of rotation as that of the secondary wheel 3.5, so that the common shaft 7 now rotates in the opposite direction in relation to nominal operation—see the arrow 106. The shaft 11 is driven via the first gear train 4, namely in a direction of rotation that corresponds to the direction of rotation of the common shaft 7—see the arrow 105. This direction of rotation (arrow 105) of the shaft 11 is opposite to the direction of rotation that has been set during nominal operation on account of the drive by the exhaust gas turbine 13, so that the exhaust gas turbine is driven in the opposite direction.

On account of the continuous rotational connection between the exhaust gas turbine and the second gear train 5, the second primary wheel 3.4 continues to be driven and now rotates in the opposite direction to that of the secondary wheel 3.5. Because, however, the second working chamber 3.2 is drained or is drained except for a predetermined residual quantity of working medium, no torque or only little torque is transmitted from the secondary primary wheel 3.4 to the secondary wheel 3.5 and the corresponding power loss is small. The second primary wheel 3.4 revolves with a slip of 200 percent with respect of the secondary wheel 3.5. As is seen, the chosen inclined blading results in a forward-swept movement between the second primary wheel 3.4 and the secondary wheel 3.5 and this contributes to a minimization of power loss.

The propulsion power transmission device of the invention or the turbo compound system of the invention offers various advantages. Thus, the switching function is integrated into the hydrodynamic clutch in a wear-free manner. The additionally required gear wheels are arranged on the "fast" side and are thus small. During braking operation, the "active" circuit, that is, the circuit that is filled with working medium, is driven in a forward-swept manner. This has the advantage that, by a targeted change in filling, the clutch slip and thus the speed of the exhaust gas turbine being operated as a pump can be varied. In this way, it is possible, for example, to prevent an excess speed or an overtorque at the exhaust gas turbine.

By targeted filling of the "inactive" clutch circuit, that is, of the working chamber that is not filled with working medium or is filled with only a predetermined residual quantity of working medium, it is possible to produce an additional braking torque within the hydrodynamic clutch.

The invention claimed is:

1. A propulsion power transmission device, comprising:
   a first interface for receiving and transmitting driving power;
   a second interface for receiving and transmitting driving power, said first and second interfaces being connected so that said first interface transmits the driving power to said second interface in a first operating mode, and said second interface transmits the driving power to said first interface in a second operating mode;
   a hydrodynamic clutch for switching between said first and second operating modes being mounted between said first and second interfaces, said hydrodynamic clutch comprising:
   a first working chamber; and
   a second working chamber, said first and second working chambers capable of being independently filled with and drained of a working medium in order to transfer torque from a first one of a plurality of primary wheels having a first set of blades to at least one secondary wheel having a second set of blades, said first and second sets of blades being arranged opposite each other; and a first gear train; and a second gear train, said first and second gear trains being mounted parallel to one another and in series with said hydrodynamic clutch, said second gear train causing a reversal in a direction of rotation in relation to said first gear train at said first or second interfaces, said first and second gear trains being respectively continuously connected to said first one of a plurality of primary wheels and said at least one secondary wheel, and said first and second gear trains being continuously connected to one of said first or second interfaces in a driving manner.

2. The propulsion power transmission device according to claim 1, wherein said first and second working chambers are bounded by said at least one secondary wheel, said common secondary wheel bearing said second set of blades in a back-to-back arrangement.

3. The propulsion power transmission device according to claim 2, wherein said common secondary wheel is continuously connected to said first interface in a driving manner, and wherein said first and second gear trains are continuously connected directly to said second interface in a driving manner.

4. The propulsion power transmission device according to claim 1, wherein said first and second sets of blades are arranged at an inclination with respect to a central axis of said hydrodynamic clutch.

5. The propulsion power transmission device according to claim 4, wherein said first working chamber is filled with and said second working chamber is drained of said working medium in said first operating mode, said second working chamber is filled with and said first working chamber is drained of said working medium in said second operating mode, and said first and second sets of blades are arranged so that during transmission of the driving power in the drained working chamber said first and second sets of blades move in a forward-swept manner relative to one another.

6. The propulsion power transmission device according to claim 2, wherein said common secondary wheel is constructed with a housing of said hydrodynamic clutch in a torsionally rigid manner, and wherein said common secondary wheel and said housing at least partially encloses said first one of a plurality of primary wheels.

7. The propulsion power transmission device according to claim 1, wherein said first one of a plurality of primary wheels and a second one of a plurality of plurality of primary wheels are each arranged on a common shaft, said first one of a plurality of primary wheels is mounted in a torsionally fixed manner on the common shaft, said second one of a plurality of primary wheels is mounted in a rotatable manner on the common shaft, said at least one secondary wheel is mounted between said first and second ones of a plurality of primary wheels and in a rotary manner on the common shaft.

8. A turbocompound system, comprising:

an internal combustion engine having a crankshaft;

an exhaust gas turbine arranged in an exhaust gas flow of said internal combustion engine, said exhaust gas turbine can be switched into a driving connection with said crankshaft;

a propulsion power transmission device, comprising:

a first interface for transmitting driving power to and from the propulsion power transmission device;

a second interface for transmitting driving power to and from the propulsion power transmission device, said first and second interfaces being connected in a driving manner, the driving power being transmitted from said first interface to said second interface in a first operating mode, the driving power being transmitted from said second interface to said first interface in a second operating mode;

a hydrodynamic clutch switched in the driving manner between said first and second interfaces, said hydrodynamic clutch comprising:

a first working chamber;

a second working chamber, said first and second working chambers capable of being independently filled with and drained of a working medium in order to transfer torque from a first primary wheel having a first set of blades to at least one secondary wheel having a second set of blades, said first and second sets of blades being arranged opposite each other; and a first gear train; and a second gear train, said first and second gear trains being switched parallel to one another in the driving manner and in series with said hydrodynamic clutch, said second gear train causing a reversal in a direction of rotation in relation to said first gear train at said first or second interfaces, said first and second gear trains being respectively continuously connected to said first primary wheel and said at least one secondary wheel, and said first and second gear trains being continuously connected to one of said first or second interfaces in a driving manner, wherein said propulsion power transmission device is arranged in the driving connection between said exhaust gas turbine and said crankshaft, said first interface is connected continuously to said crankshaft in the driving manner, and said second interface is connected continuously to said exhaust gas turbine in a driving manner.

* * * * *